United States Patent

McCullough

[15] 3,698,637
[45] Oct. 17, 1972

[54] SPRAY DEVICE FOR IRRIGATION PURPOSES

[72] Inventor: Floyd W. McCullough, 4325 North Delno, Fresno, Calif. 93705

[22] Filed: June 21, 1971

[21] Appl. No.: 154,910

[52] U.S. Cl. .................................. 239/68, 239/588
[51] Int. Cl. .............................................. A01g 27/00
[58] Field of Search........... 239/67, 68, 455, 587, 588

[56] References Cited

UNITED STATES PATENTS

| | | |
|---|---|---|
| 1,752,193 | 3/1930 | O'Hanlon .................. 239/588 |
| 3,216,663 | 11/1965 | Frampton et al. ........... 239/68 |

Primary Examiner—M. Henson Wood, Jr.
Assistant Examiner—Thomas C. Culp, Jr.

[57] ABSTRACT

A spray device which can cover a wide variety of sized and shaped areas, and which can be easily adjusted to cover a desired area. In operation, the device stores inflowing water under pressure, and energy in the form of compressed air, in a pneumatic pressure tank and intermittently discharges the water through a nozzle at rates greater than the inflow rate. With each discharge cycle, the nozzle is automatically rotated to point in a slightly different direction and adjusted for pressure at which discharge begins, and for quantity discharged, so that the spray pattern will extend to desired boundaries. Features are incorporated which provide uniform coverage as the nozzle rotates, with progressive discharges. From a given supply source and conduit, a larger nozzle can be used, (and a larger area sprayed) than with conventional spray devices. The device is not subject to clogging from debris in the supply source and will operate satisfactorily on varying source pressure and/or throttled inflow conditions.

10 Claims, 4 Drawing Figures

PATENTED OCT 17 1972
3,698,637
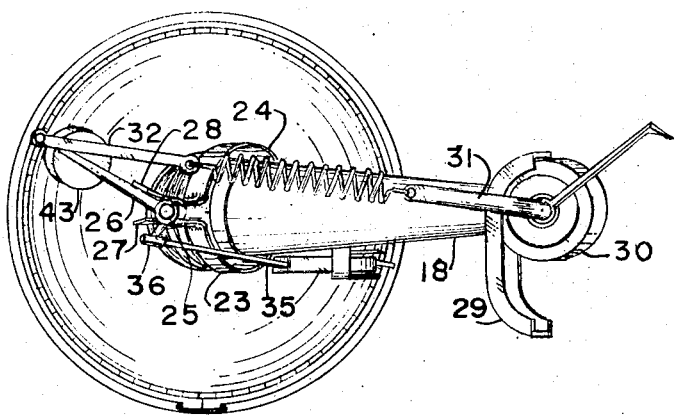
FIG. 2.
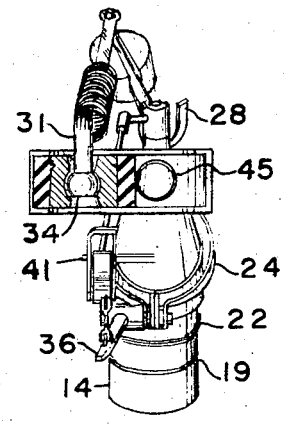
FIG. 4.
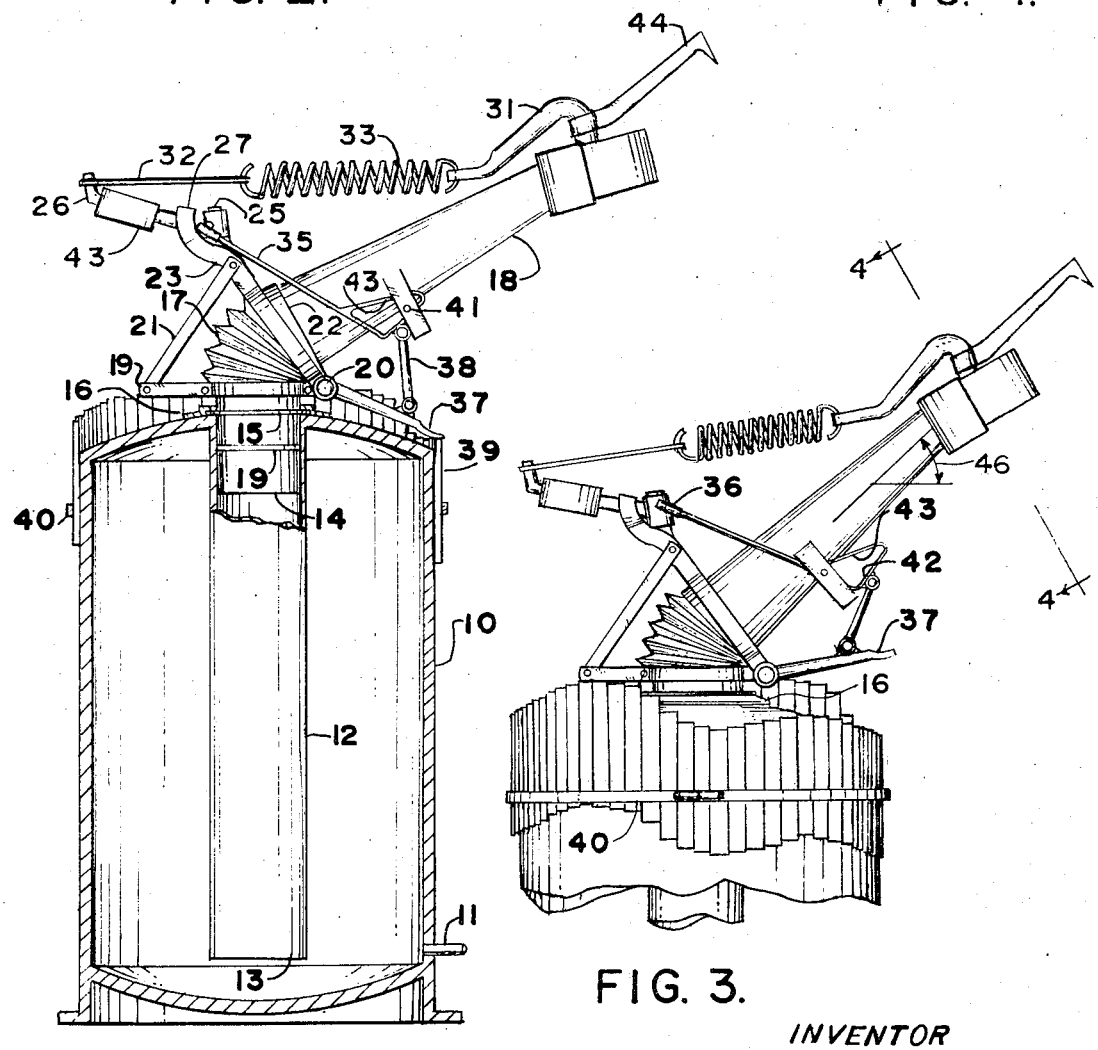
FIG. 3.
FIG. 1.
INVENTOR
Floyd M. McCullough

SPRAY DEVICE FOR IRRIGATION PURPOSES

This invention relates to a device capable of uniformly spraying water over a wide variety of size and regular or irregular shaped areas, primarily for irrigation purposes. The device can easily be adjusted for different size and shaped areas and will operate satisfactorily from the standpoint of uniform coverage of the desired area from a modest supply source containing suspended foreign matter such as moss, fish, etc, and even under fluctuating pressure conditions.

It is known in prior art that individual spray devices cannot satisfactorily spray irregular shaped areas and lack capability of being adjusted to spray various sizes and configurations of regular shaped areas. Moreover, the maximum size of the area sprayed is limited by the rate water can be delivered to the device from the supply source. In addition, clogging of the device and varying spray patterns result from moss, fish, etc, and pressure fluctuation in the supply source.

The object of this invention is to provide a spray device which (1) can be easily adjusted to uniformly spray water over a wide variety of size and shaped areas at application rates compatible with absorption rates of impervious types of soil-thus saving water by confining the spray pattern to desired boundaries, by eliminating overlapping patterns when multi-units are used, and by eliminating unnecessary run-off; (2) can cover an area of up to as much as one acre, or larger, from a relatively small size supply conduit and water pressure source, thereby making it more feasible to install permanent systems because less and smaller size pipe and less obstructing spray devices would be used compared to conventional systems; (3) will continue to spray the selected area uniformly when pressure of the source fluctuates widely; (4) will once installed and adjusted, use the energy from the source to operate its mechanism automatically without external controls, other energy source, or attention whatsoever; (5) can be adjusted to spray at a desired rate compatible with one or more similar devices supplied from the same source to compensate for any variation in pressure in the supply source at the device as caused by differential friction losses in the supply pipes or by differences in elevation of the devices so that all units in a multi-unit area have the same application rate; (6) have a vital mechanism which is comparatively simple, rugged and easily accessible for adjustment, maintenance or repair; (7)inherently incorporates an air cushion which eliminates hydraulic shocks in the device itself as well as in the supply conduit caused by sudden shut-off of water supply (8) has no constrictions in its water passages and thus passes without clogging foreign matter which happens to come through the supply source such as moss, fish, etc.

This invention incorporates a pressure vessel into which water is continually fed under pressure and from which water intermittently discharges through a nozzle emerging from the top of the vessel which is oriented at various angles above the horizon and equipped with an automatically controlled shut-off mechanism. When the nozzle is shut off, water fill the vessel compressing air trapped at the top of the vessel. When discharging, the compressed air tends to empty the vessel because the discharge capacity is greater than the inflow rate. With each discharge cycle the nozzle automatically points in a slightly different direction and adjusts itself to a corresponding pre-selected setting to reach the boundary of the area being sprayed. Other features are incorporated to insure uniform coverage of this same area.

The above described intermittent discharge principle in effect has the advantages of a large nozzle and supply source, insofar as length of nozzle discharge is concerned, in that there is a greater mass of water per area exposed to air resistance with only a small supply source, the nozzle stream thus travels further through the air before being broken up into a spray by air resistance. Since nozzle discharge occurs only when pressure in the tank reaches the pre-selected maximum, the device is unaffected by varying supply rate and pressure conditions except that if supply rate and pressure were consistently below normal the application rate would be lowered while on the other hand if consistently higher, the rate would be raised.

This invention possesses other objects and features of advantage some of which, with the foregoing, will be set forth in the following description of the preferred embodiment of the invention. One must understand that the invention is not limited to the disclosed embodiment only, but includes variant embodiments thereof within the scope of the claims.

Referring to the drawing:

FIG. 1 shows a side view of the device during pressure build-up at a pressure nearing nozzle discharge with a portion of the pressure vessel and discharge pipe removed to show inner parts.

FIG. 2 shows a plan view of FIG. (1).

FIG. 3 shows a partial side view of the device during discharge with pressure reduced to that near shut-off of the nozzle.

FIG. 4 shows a section view of the nozzle mechanism taken on line 4—4 of FIG. (3).

Referring to the drawing in greater detail and to FIG. (1) in particular, the device consists of a pressure vessel 10 which is continuously supplied by water under pressure at inlet pipe 11 from a remote source. Outflow from the vessel occurs through discharge pipe 12 which is an integral part of the pressure vessel and which is open at its lower end 13. Into the upper end of pipe 12 is fitted pipe 14 which introduces water under pressure into a nozzle assembly. The nozzle assembly shuts off outflow when pressure therein reaches a certain minimum and starts flow when such pressure (trip pressure) reaches certain maximums. When outflow is shut off, water fills vessel 10 compressing the air trapped above the water in the annular space between the walls of vessel 10 and pipe 12.

As the pressure increases, the inflow rate in pipe 11 diminishes with commensurate reduction in friction losses in pipe 11 tending toward a pressure equilibrium between vessel 10 and the source. A maximum pressure of a magnitude approaching that of the supply source is therefore available upon discharge, to reach the furthest boundaries of the area being sprayed using a smaller supply pipe than would be required if nozzle spray were continuous. Conversely, when pressure diminishes in vessel 10, inflow rate increases since pressure from the source is available to overcome friction losses in pipe 11. In addition, the spray application rate can be reduced by throttling in flow in pipe 11 by means of a valve. It should be noted that such throttling would only cause the vessel to fill to the "trip pressure" at a slower rate and thus the spray pattern would not be affected under such throttled condition and the equilibrium principle between vessel 10 and the source, described above, would not be affected.

When the device is discharging, water flows through pipe 12, pipe 14, bellows 17 and through nozzle 18, emerging into the atmosphere through opening 45 (FIG. 4). Nozzle 18 has a conical interior shape, similar to that of a conventional firehose which converts the water pressure entering the nozzle to velocity at its opening 45. Pipe 14 is fitted into pipe 12 with suitable clearance to allow free rotation therein, is sealed against pressure leakage by means of O-ring gasket 19 and restrained within pipe 12 against the water pressure by means of collar 15 affixed to pipe 14 which in turn bears against retainer ring 16 affixed to vessel 10. Bellows 17 is constructed of rubberized fabric or similar material to expand or contract in the direction of flow against a restraining force, described later, as pressure therein increases or decreases respectively. Bellows 17 is suitably attached to pipe 14 and nozzle 18 by means of members 19 and 22 which serve as clamps but which also provide restraint by means of eyes constructed in the ends of members 19 and 22 through which is passed pin 20 allowing member 22 to rotate with respect to members 19. Thus, when bellows 17 expands or contracts, the angle of the axis of the nozzle 18 above the horizon (angle 46 FIG. 3) decreases or increases respectively. Members 23 and 24 (also see FIG. 2) are rigidly supported with respect to pipe 14 by means of pin 20 which also passes through eyes in members 23 and 24 and by member 21 which provides further restraint. Pin 25 is suitably attached to members 23 and 24 and mounted thereon is member 26 which is free to rotate between stops 27 and 28 (FIG. 2).

Channel 29 is an integral part of nozzle 18 and serves as a support and guide for wheel 30. Wheel 30 shuts off nozzle discharge for pressure build-up (FIG. 2) and during discharge rolls to the position shown in FIG. 4. The periphery of wheel 30 is urged against channel 29 by tension in spring 33 and connecting members 31 and 32 linking wheel 30 to member 26. The ball and socket joint 34 (FIG. 4) avoids binding between member 31 and wheel 30 as the nozzle tilts. The discharge end of nozzle 18 is shaped to fit wheel 30 and has a slightly raised rim 45 (FIG. 4) which presses into a rubber cover on the periphery of wheel 30 to effect a pressure seal.

It can be seen in FIG. 2 that when member 26 rests against stop 28 tension in spring 33 forces wheel 30 to the position shown shutting off nozzle flow. Similarly when member 26 rotates to a position against stop 27, wheel 30 rolls to the discharge position.

Member 35 is attached by ball and socket joint 36 (FIG. 2) to member 26 and linked to member 37 by member 38. Member 37 is free to rotate on pin 20 but is restricted in its downward movement by one of the members 39. Members 39 are a number of flat bars suitably clamped to tank 10 by a clamp member 40. It can be seen that by loosening member 40, members 39 can be slid up or down to adjust the downward movement of member 37 for any direction in which the nozzle assembly happens to be pointing.

During pressure build-up bellows 17 expands against the restraining force provided by spring 33 until the lower, or right end of member 35 is prevented from dropping further by restraint originating at member 39 and pin 41 comes in contact with the face 42 (FIG. 3) of member 35. As depression of nozzle 18 continues, pin 41 forces member 35 to the right and member 26 thereby rotates counter-clockwise (FIG. 2). As member 26 rotates the direction of the force exerted by spring 33 changes until a point is reached where wheel 30 begins to roll in channel 29 from the position sealing off flow from nozzle 18. Nozzle discharge then begins. As member 32 passes directly over and beyond pin 25 (FIG. 2) spring 33 takes over and forces member 26 against stop 27.

When discharge first occurs pressure on the nozzle and the nozzle reach (furthest distance from the device being wetted) are both at a maximum. As discharge continues decreasing pressure on bellows 17 due to the emptying of tank 10 and continued tension on spring 33 causes nozzle 18 to tilt upward (angle 46 FIG. 3 to increase). This upward tilting movement, for angles of up to 45° above the horizon, tends to lengthen nozzle reach and to compensate for the falling nozzle pressure to achieve uniform distribution. Such compensation is necessary since with a non-tilting nozzle, the volume of water sprayed would vary directly with the diminishing nozzle reach whereas to achieve uniform coverage the volume must be a function of the square of the nozzle reach.

Since significant nozzle pressure remains when nozzle shutoff occurs virtually the entire spray pattern reaches beyond the immediate area of the device. To spray the immediate area, the pointed end of member 44, which is rigidly attached to member 31, moves into the nozzle stream during the latter portion of the discharge cycle (FIG. 2) as member 31 rotates in ball and socket joint 34 thus deflecting a portion of the nozzle stream to the immediate area.

As the upward tilting of nozzle 18 continues, pin 41 slides along face 43 of member 35 for a distance, then engages with and causes member 35 to move leftward and to rotate member 26 clockwise (FIG. 2). When member 26 passes beyond the dead center position, member 32 crosses directly over pin 25, spring 33 takes over and accelerates rotation of member 26 until stopped by 28. The momentum of member 26, augmented by weight 43, suddenly stopped by 28 causes the nozzle assembly to rotate clockwise slightly and at the same time wheel 30 to roll to shut-off position (FIG. 2) thus ending the old cycle and beginning the new.

I claim:

1. A water spraying device comprising: a pressure vessel operated by water continuously inflowing thereto from a pressure source; a nozzle assembly, with a larger flow capacity than said inflow, disposed at the top of said vessel; means whereby water supplied said nozzle assembly is supplied from near bottom of said vessel; means whereby flow through said nozzle assembly is automatically stopped to effect a pressure build-up cycle wherein water fills said vessel compressing air trapped at the top of said vessel and then started to effect a discharge cycle wherein energy from said compressed air and water stored in said vessel augments said inflow to achieve greater discharge rate than said inflow rate; means whereby said nozzle assembly is disposed to said vessel in a manner that resists internal pressure and allows rotation so that a vertical plane through the axis (centerline) of said nozzle assembly can be oriented in any direction with respect to said vessel; means whereby axis of said nozzle inclines at various angles above a horizontal plane, and with respect to the non-tilting portion of said nozzle assembly, the magnitudes of which are approximately in inverse proportion to internal pressure on inlet of said nozzle; means whereby flow through said nozzle is automatically started and stopped as said angle above the horizon varies between certain maximum and pre-selected minimum limits, respectively, means whereby said pre-selected minimum limit is dependent upon orientation of said vertical plane with respect to said vessel, means whereby said vertical plane is automatically and randomly reoriented slightly with respect to said vessel with each discharge cycle; means whereby an object is introduced into the stream emerging from said nozzle, during the latter portion of said discharge cycle, to partially impede said stream.

2. A water spraying device according to claim 1 wherein said mechanism to alternately start and stop said flow to effect said discharge and pressure build-up cycle is disposed at the discharge end of said nozzle.

3. A water spraying device according to claim 2 wherein said start and stop mechanism consists of a wheel urged against and sealing said discharge end which also rolls to and a short distance from said discharge end on a plane approximately perpendicular to said nozzle axis while said urging force is maintained on said wheel alternately vacating and occupying said discharge end which correspondingly causes said discharge cycle to start and stop.

4. A water spraying device according to claim 3 wherein force to cause said wheel to alternately roll to and from said discharge and to remain in such position, is provided by corresponding alternate deviation of the direction of said urging force from a vertical plane which contains said nozzle axis, thus creating a component force on said wheel in the direction of said positions.

5. A water spraying device according to claim 1 wherein said means to vary the inclination of said axis above the horizon consists of (a) a bellows disposed between non-tilting portion of said nozzle assembly and said nozzle which expands against a restraining force in the direction of flow in said nozzle assembly in proportion to internal pressure on said bellows (b) linkage disposed to said nozzle to cause said angle to decrease as said bellows expands and (c) a coil spring suitably disposed between said non-tilting portion of said nozzle assembly and said nozzle to provide said restraining force.

6. A water spray device according to claim 1 wherein said means to vary said inclination of said nozzle axis at various angles above a horizontal plane incorporates an elastic member, such as a coil spring, suitably attached at one end to said non-tilting portion of said nozzle assembly and on the other end to a mechanism disposed at said discharge end of said nozzle to alternately start and stop said nozzle flow.

7. A water spraying device according to claim 3 wherein said urging force is directed against a member disposed to said wheel by means of a ball and socket joint which allows said wheel to rotate on its axis with respect to said member and also allows said member to rotate on an axis perpendicular to said axis of said wheel.

8. A water spray device, according to claim 4, wherein said deviation of direction of said urging force is provided by suitably attaching one end of an elastic member, such as a coil spring, to axis of said wheel and the other end to an anchor member disposed to said non-tilting portion of said nozzle assembly in a manner which allows said point of attachment to move on either side of said vertical plane between restraining stops in response to tilting of said nozzle.

9. A water spray device, according to claim 8, wherein said vertical plane is reoriented slightly in azimuth, and with respect to said pressure vessel, by means of momentum of said anchor member as it strikes one of said restraining stops at end of said discharge cycle.

10. A water spraying device according to claim 1 wherein means to provide said pre-selected minimum limit dependent upon orientation of said vertical plane with respect to said vessel consists of a number of adjustable segments disposed to the periphery of said vessel in a manner than each can originate a force, as said angle of said nozzle above the horizon decreases, through suitable mechanical linkage, to effect start of flow through said nozzle.

* * * * *